US010415645B2

(12) United States Patent
Katayama et al.

(10) Patent No.: US 10,415,645 B2
(45) Date of Patent: Sep. 17, 2019

(54) TORQUE TRANSMISSION DEVICE (71) Applicant: HONDA MOTOR CO., LTD., Tokyo (JP)

(72) Inventors: Yuji Katayama, Wako (JP); Michihiro Komatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 15/544,747

(22) PCT Filed: Jan. 26, 2016

(86) PCT No.: PCT/JP2016/052216
§ 371 (c)(1),
(2) Date: Jul. 19, 2017

(87) PCT Pub. No.: WO2016/121772
PCT Pub. Date: Aug. 4, 2016

(65) Prior Publication Data
US 2018/0003242 A1    Jan. 4, 2018

(30) Foreign Application Priority Data
Jan. 29, 2015   (JP) ................................. 2015-016142

(51) Int. Cl.
*F16D 1/116* (2006.01)
*F16C 3/02* (2006.01)
(Continued)

(52) U.S. Cl.
CPC .............. *F16D 1/116* (2013.01); *F16C 3/026* (2013.01); *F16D 1/02* (2013.01); *F16D 1/112* (2013.01);
(Continued)

(58) Field of Classification Search
CPC .... F16B 2/06; F16B 2/245; F16B 7/02; F16B 7/0406; F16B 7/0413; F16B 21/18;
(Continued)

(56) References Cited

U.S. PATENT DOCUMENTS 3,279,835 A * 10/1966 Krohm ................... F16B 7/0413
403/359.5
10,253,819 B2 * 4/2019 Sherlock ................. F16D 1/116
2012/0157217 A1    6/2012 Nakamura et al.

FOREIGN PATENT DOCUMENTS

| CN | 2756897 Y | 2/2006 |
| JP | 1-307506 A | 12/1989 |

(Continued)

OTHER PUBLICATIONS

International Search Report dated Apr. 19, 2016, issued in counterpart International Application No. PCT/JP2016/052216 (2 pages).

(Continued)

*Primary Examiner* — Josh Skroupa
(74) *Attorney, Agent, or Firm* — Westerman, Hattori, Daniels & Adrian, LLP (57) ABSTRACT

A torque transmission shaft between end joints and a cylindrical member. Circlips are fitted in annular grooves formed in the end joints. The circlips abut and lock the outer collars. The outer collars each include a smaller diameter portion, and an end surface of the smaller diameter portion includes a plurality of hollow portions. The hollow portions allow a clearance between a serrated portion and the smaller diameter portion to communicate with the exterior of the outer collar. Air bubbles contained in an adhesive are allowed to escape out of the clearance through the hollow portions, and thus the clearance, is filled with the adhesive densely.

4 Claims, 7 Drawing Sheets (51) Int. Cl.
 *F16D 1/02* (2006.01)
 *F16D 1/112* (2006.01)
 *F16D 1/10* (2006.01)

(52) U.S. Cl.
 CPC ... *F16D 2001/103* (2013.01); *Y10T 403/7033* (2015.01)

(58) Field of Classification Search
 CPC ........ F16B 21/186; F16C 3/023; F16C 3/026; F16D 1/027; F16D 1/068; F16D 1/0858; F16D 1/087; F16D 1/108; F16D 1/112; F16D 1/116; F16D 2001/102; F16D 2001/103; F16D 2250/0069; Y10T 403/471–473; Y10T 403/477; Y10T 403/66; Y10T 403/7033; Y10T 403/7176
 USPC ............. 403/266–268, 270, 341, 359.5, 397; 464/181–183
 See application file for complete search history.

(56) References Cited

FOREIGN PATENT DOCUMENTS

| | | |
|---|---|---|
| JP | 2011-52719 A | 3/2011 |
| JP | 2014-222069 A | 11/2014 |

OTHER PUBLICATIONS

Search report dated Dec. 11, 2018, issued in counterpart CN application No. 201680005208.X, with English translation. (4 pages).
Office Action dated Dec. 11, 2018, issued in counterpart CN application No. 201680005208.X, with English translation. (9 pages).

* cited by examiner

ENLARGED X

TORQUE TRANSMISSION DEVICE

TECHNICAL FIELD

The present invention relates to a torque transmission device such as a torque transmission shaft used, for example, as a propeller shaft (drive shaft) of a vehicle.

BACKGROUND ART

Conventional torque transmission shafts (torque transmission devices) used as propeller shafts (drive shafts) of vehicles are disclosed, for example, in Patent Documents 1 and 2. The torque transmission shafts include a cylinder made of fiber reinforced plastics (FRP) and end joints made of metal and coupled to both ends of the cylinder. The FRP cylinder provides the advantage of achieving weight reduction while ensuring the necessary strength and durability.

The torque transmission device disclosed in Patent Document 2 includes an FRP cylindrical member and outer collars. The FRP cylindrical member is fitted to a region of a serrated portion formed on the outer circumferential surface of each of end joints. The outer collars connect the end joints to the cylindrical member. The outer collars each include a larger diameter portion and a smaller diameter portion. The larger diameter portion of the outer collar is coupled to the outer circumferential surface of the cylindrical member, and the smaller diameter portion of the outer collar is coupled to the serrated portion of the end joint.

That is, the securement between the end joints and the FRP cylindrical member and the securement between the end joints and the outer collars are both provided by the serrated portions of the end joints. This configuration eliminates the need to form, in each end joint, a special securement portion (for example, a non-circular cross sectional shaft portion included in the drive shaft disclosed in Patent Document 1), and as a result, simplifies the process for forming the end joints.

RELATED ART DOCUMENTS

Patent Documents

[Patent document 1] Japanese Unexamined Patent Application Publication No. 2011-052719
[Patent document 2] Japanese Unexamined Patent Application Publication No. 2014-222069

DISCLOSURE OF THE INVENTION

Problems to be Solved by the Invention

Torque transmission shafts of conventional configurations, such as described above, pose a concern associated with the assembling step, in which the torque transmission shaft is press fitted and coupled to another component, such as a constant velocity joint (CVJ). Specifically, the load during the press-fitting may cause misalignment at the locations of coupling between the outer collars and the end joints and between the outer collars and the cylindrical member, and this may result in disengagement of the outer collars, for example. One possible approach to preventing the misalignment and disengagement of the outer collar is to attach a circlip (lock member). The circlip is configured to abut the axial end of the outer collar so as to retain (prevent misalignment of) the outer collar with respect to the end joint and the cylindrical member.

However, mounting of a circlip, such as described above, causes the radial space (clearance) between the serrated portion of the end joint and the sleeve of the outer collar to be closed by the circlip at the axial end of the space. As a result, air bubbles cannot be allowed to escape out of the space. Consequently, there is a possibility that the space may not be completely filled with an adhesive and therefore sufficient joint (securement) strength between the end joint and the cylindrical member via the outer collar may not be obtained.

The present invention has been made in view of the above circumstances. Accordingly, an object of the present invention is to configure a torque transmission shaft (torque transmission device) to have increased coupling strength between end joints and a cylindrical member to achieve high transmission torque while effectively preventing misalignment and disengagement of outer collars (connection members) at the locations of coupling between the end joints and the cylindrical member in the step of press fitting the torque transmission shaft to another component, such as a constant velocity joint.

Means of Solving the Problems

The present invention is provided to solve the above problems. According to one aspect of the present invention, a torque transmission device includes end joints (12), serrated portions (14), a cylindrical member (18), connection members (20), and lock members (15). The end joints (12) each have a shaft shape and are configured to transmit torque from one side to an other side. The serrated portions (14) are each formed on an outer circumferential surface of a corresponding one of the end joints (12) at an end of the end joint. The cylindrical member (18) is fitted to a region of each of the serrated portions (14) at an inner circumferential surface (18c) of the cylindrical member (18). The connection members (20) each have a cylindrical shape and connects a corresponding one of the end joints (12) to the cylindrical member (18). Each of the connection members (20) includes a larger diameter portion (24), fitted to an outer circumferential surface (18e) of the cylindrical member (18) at an end (18a) of the cylindrical member (18), and a smaller diameter portion (26), fitted to a corresponding one of the serrated portions (14). The smaller diameter portion (26) includes an end surface (26a) including at least one hollow portion (27). The hollow portion (27) is constituted by a hollow formed in the end surface (26a) in an axial direction. The hollow portion (27) allows a clearance (44) to communicate with an exterior of the connection member (20). The clearance (44) is provided between the serrated portion (14) and the smaller diameter portion (26). The lock members (15) are each disposed at a position adjacent to the serrated portion (14) in a corresponding one of the end joints (12) so as to abut and lock the end surface (26a) of the smaller diameter portion (26) of a corresponding one of the connection members (20).

In the torque transmission device according to the first aspect of the present invention, the lock members are provided, each at the position adjacent to the serrated portion in a corresponding one of the end joints. The lock members abut and lock the end surface of the smaller diameter portion of a corresponding one of the connection members. The presence of the lock members effectively prevents misalignment and disengagement of the connection members at the locations of coupling between the end joints and the cylindrical member, in the step of press fitting the torque transmission device (the end joints and cylindrical member that are joined to each other via the connection members) to a constant velocity joint. Moreover, at least one hollow portion is formed in an end surface of the smaller diameter portion of each of the connection members, the end surface being adjacent to the lock member. The hollow portion is constituted by a hollow formed in the end surface in an axial direction. The hollow portion allows the clearance provided between the serrated portion and the inner circumferential surface of the smaller diameter portion to communicate with the exterior of the connection member. Thus, the clearance between the serrated portion and the smaller diameter portion of the connection member is not closed by the lock member. Thus, air bubbles can be allowed to escape out of the clearance between the serrated portion and the smaller diameter portion of the connection member via the hollow portion. Consequently, the clearance is completely filled with a joining adhesive and therefore high joint (securement) strength between the end joint and the cylindrical member via the connection member is achieved. Accordingly, a torque transmission device that provides high transmission torque is achieved.

That is, in the torque transmission shaft according to the first aspect of the present invention, despite the presence of the lock members for preventing misalignment and disengagement of the connection members, the escape of air bubbles from the clearances between the serrated portions and the connection members (smaller diameter portions), is ensured. As a result, air inclusion in the adhesive, which is used to join the connection members to the serrated portions and to the cylindrical member, is reduced and therefore the adhesive strength is increased. Furthermore, the locations of joint between the connection members and the serrated portions and between the connection members and the cylindrical member are filled with the adhesive, and as a result, water or air, for example, is prevented from flowing into the locations of joint. Thus, even when in use for an extended period of time, a decrease in strength at the locations of joint is effectively prevented. Consequently, sufficient joint (securement) strength between the end joints and the cylindrical member via the connection members is ensured.

In the torque transmission device according to the first aspect of the present invention, each of the lock members (15) may be a circlip (15). The circlip (15) may be fitted in an annular groove (13) at a position adjacent to the serrated portion (14) in each of the end joints (12). The hollow portion (27) may include a region located radially outward of an outer circumferential edge of the circlip (15) and at least the region may not be covered by the circlip (15) and may be exposed.

With this configuration, a region in the hollow portion is not covered by the circlip but is exposed, and via the exposed region, the clearance between the serrated portion and the connection member (smaller diameter portion) is allowed to communicate with the exterior of the connection member. Consequently, the air bubbles that have entered into the space between the serrated portion and the connection member (smaller diameter portion) are allowed to escape to the exterior with certainty.

In the torque transmission device according to the first aspect of the present invention, the larger diameter portion (24) of each of the connection members (20) may be a cylindrical sleeve (30), and the end (18a) of the cylindrical member (18) may be interposed between a corresponding one of the sleeves (30) and a corresponding one of the serrated portions (14).

With this configuration, by applying an adhesive, in assembling, to the outer circumferential surface of the cylindrical member at its ends, the outer circumferential surface of the cylindrical member is adhered and secured to the inner circumferential surfaces of the sleeves, and also, the inner circumferential surface of the cylindrical member is press fitted and secured to the outside surfaces of the serrated portions. As a result, the cylindrical member and the end joints are rigidly secured to each other at both the inner circumference and the outer circumference of the cylindrical member. Consequently, transmission of torque (e.g., rotational torque, torsional torque, and other torques) is accomplished more smoothly. It should be noted that the above reference characters in parentheses correspond to the reference characters used for the constituent elements in the embodiments, which will be described later. The embodiments are examples of the present invention.

Effects of the Invention

Torque transmission devices according to the present invention have an effectively increased coupling strength between the cylindrical member and the end joints and thus achieve high transmission torque. At the locations of coupling between the end joints and the cylindrical member, misalignment of the connection members and resulting disengagement of the connection members are prevented, in the step of press fitting the torque transmission device to another component, such as a constant velocity joint.

Figure 1:
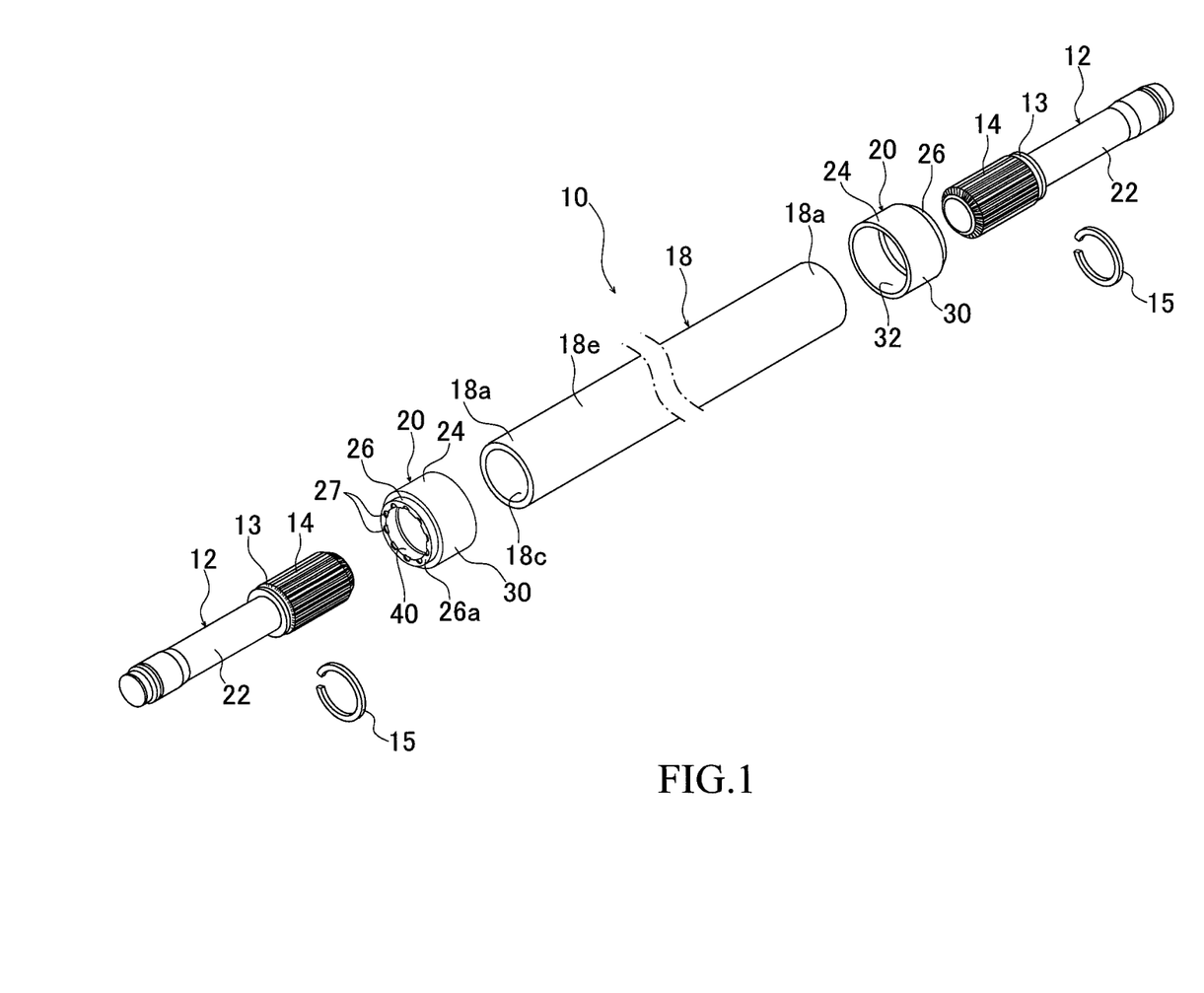
FIG. 1 is a perspective view of a torque transmission shaft (torque transmission device), in an exploded state, according to an embodiment of the present invention.
Figure 2:
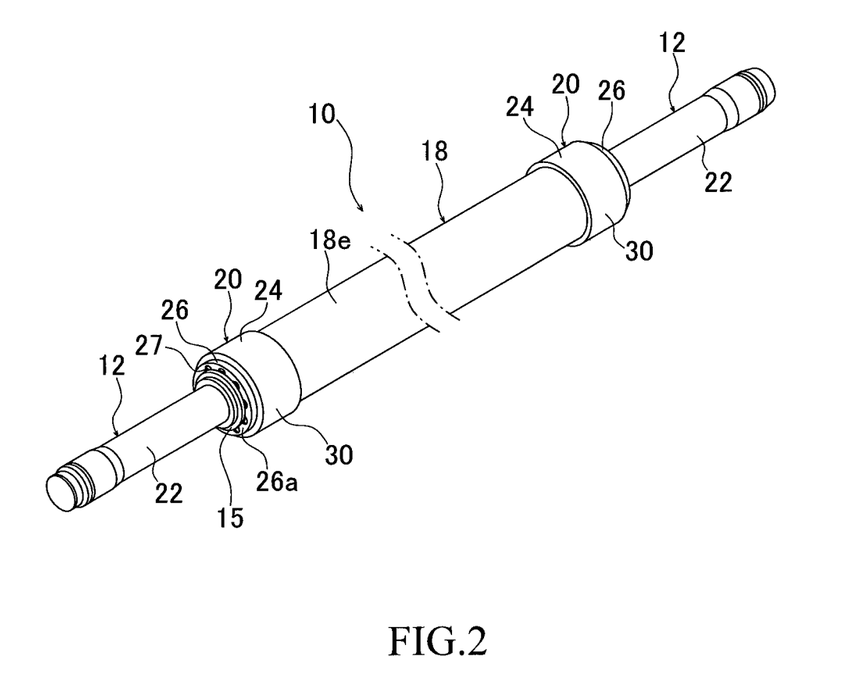
FIG. 2 is a perspective view of the torque transmission shaft in an assembled state.
Figure 3:
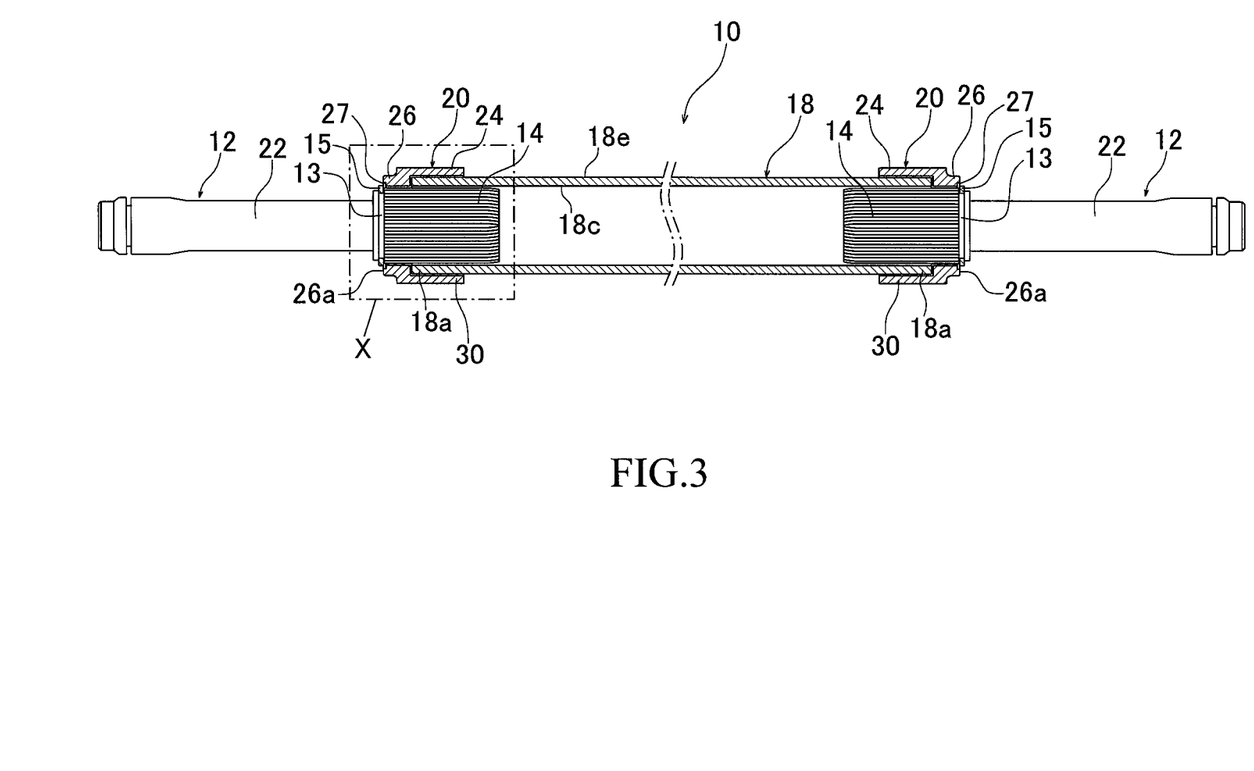
FIG. 3 is a side view (a sectional view) of the torque transmission shaft.
Figure 4:
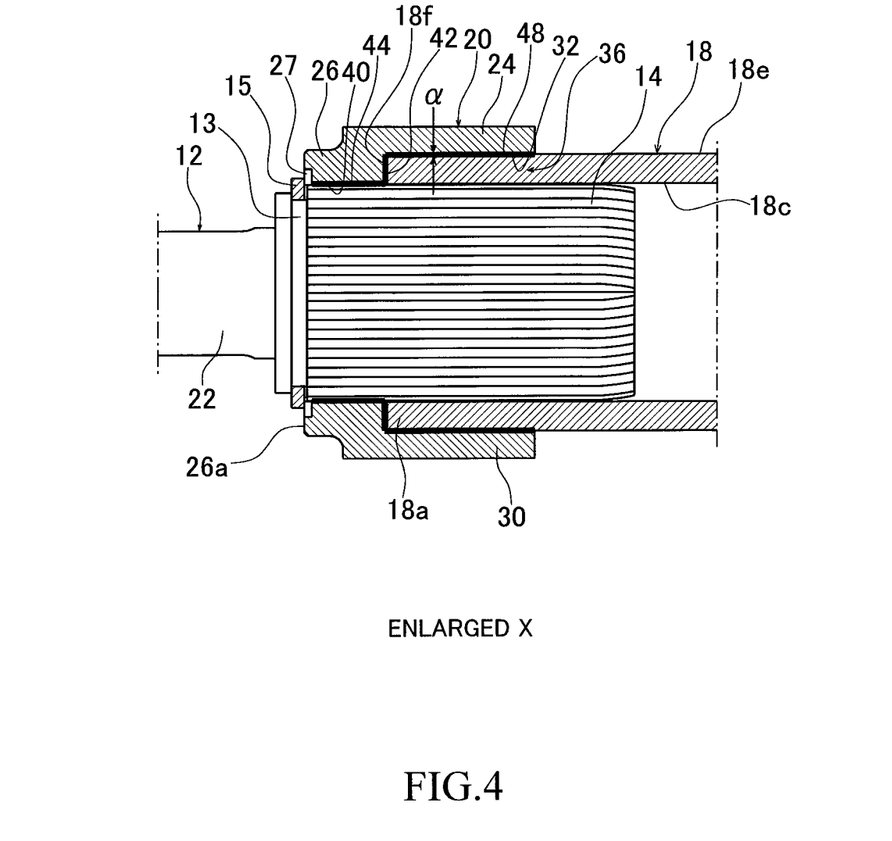
FIG. 4 is a partial sectional side view of the torque transmission shaft (an enlarged view of the portion denoted as X in FIG. 3).

An embodiment of the present invention will now be described in detail with reference to the accompanying drawings. FIGS. 1 and 2 are perspective views of a torque transmission shaft (torque transmission device) according to the embodiment of the present invention, in an exploded state and in an assembled state, respectively. FIG. 3 is a side view (a sectional view) of the torque transmission shaft, and FIG. 4 is a partial sectional side view of the torque transmission shaft (an enlarged view of the portion denoted as X in FIG. 3). As illustrated in the drawings, a torque transmission shaft (torque transmission device) 10 according to the embodiment of the present invention includes a cylindrical shaft (cylindrical member) 18, end joints 12, 12, and outer collars (connection members) 20, 20. The cylindrical shaft 18 is a shaft main body made of FRP and includes ends 18a, 18a. The end joints 12, 12 are coupled (secured) to the respective ends 18a, 18a via the respective outer collars, 20, 20, which are cylindrically shaped. The end joints 12, 12 are of the same configuration, and the outer collars 20, 20 are of the same configuration. Thus, hereinafter, elements of one of the end portions will be described in detail, whereas elements of the other end portion are assigned the same reference numerals and will not be described in detail.

In this embodiment, a drive shaft is described as an example of a torque transmission device according to the present invention. The drive shaft transmits rotational torque from a drive source such as an engine mounted in a vehicle. However, this example is not limiting. For example, the torque transmission device may be used as a torque transmission means for a propeller shaft or a stabilizer (not illustrated), or another component.

The torque transmission shaft 10 includes the end joint 12, the cylindrical member (shaft main body) 18, and the outer collar (connection member) 20. The end joint 12 is in the shape of a shaft and transmits rotational torque from one side to the other side. The cylindrical member 18 is made of fiber reinforced plastics (FRP) and has an inner circumferential surface 18c, which is fitted to a region of a serrated portion 14. The serrated portion 14 is formed at one end of the end joint 12, on the outer circumferential surface. The outer collar (connection member) 20 connects the end joint 12 to the cylindrical shaft 18.

The FRP cylindrical shaft 18 is a hollow cylindrical body having a through hole, and is formed of, for example, a plurality of carbon fiber reinforced plastics (CFRP) layers that are formed by rolling a plurality of prepregs into a cylindrical shape and heat curing the prepregs. The prepregs are formed by impregnating carbon fiber with a thermosetting resin. Alternatively, the cylindrical shaft 18 may be formed by injection molding a resin in which short carbon fiber is dispersed.

The end joint 12 is made of a metal material and includes a shank portion 22 and a serrated portion 14. The shank portion 22 is in the shape of a solid rod. The serrated portion 14 is disposed contiguously with an axial end of the shank portion 22 and is press fitted to the inner circumferential surface 18c at the end 18a of the cylindrical shaft 18. The serrated portion 14 (its outer circumferential surface) includes serrations such as, for example, triangular serrations and involute serrations. In this embodiment, the serrated portion 14 is a one-piece portion formed along the axial direction of the end joint 12, but this is not limiting. For example, the serrated portion 14 may be formed by a plurality of discrete rings arranged along the axial direction of the end joint 12.

In the end joint 12, at a position adjacent the serrated portion 14 in the axial direction (adjacent position closer to the shank portion 22), an annular groove 13 is provided so that a circlip (lock member) 15 can be fitted therein. The circlip 15, which is fitted into the groove 13, is a component made of elastic metal and having an approximately C-shape with part of the ring cut out.

The outer collar 20 is an approximately circular annular body (cylindrical body) made of a metal material and includes a larger diameter portion 24 and a smaller diameter portion 26. In this embodiment, the larger diameter portion 24 is a portion having a relatively large inside diameter in the outer collar 20, and the smaller diameter portion 26 is a portion having a relatively small inside diameter in the outer collar 20. The larger diameter portion 24 and the smaller diameter portion 26 are integral and contiguous with each other along the axial direction.

The larger diameter portion 24 is formed by a sleeve 30 (annular body), which is cylindrical and has a relatively large diameter. The sleeve 30 is disposed with its axis (the cylinder axis) oriented approximately parallel with the axis of the end joint 12. An annular space 36 is provided between the inner circumferential surface, 32, of the sleeve 30 and the serrated portion 14. The end 18a of the cylindrical shaft 18 is inserted in the annular space 36 (see FIG. 4).

The smaller diameter portion 26 is formed by an annular body having a relatively small diameter and includes an inner circumferential surface 40 and an annular side wall 42. The inner circumferential surface 40 is press fitted to the serrated portion 14 of the end joint 12. The annular side wall 42 faces an end surface 18f of the cylindrical shaft 18. A clearance 44 is provided between the smaller diameter portion 26 of the outer collar 20 and the serrated portion 14 of the end joint 12 (radial space). The clearance 44 will be described later.

The larger diameter portion 24 of the outer collar 20 is coupled and secured to the outer circumferential surface, 18e, of the cylindrical shaft 18. The smaller diameter portion 26 of the outer collar 20 is coupled and secured to a region of the serrated portion 14. The end 18a of the cylindrical shaft 18 is press fitted and secured to the remainder of the serrated portion 14 of the end joint 12, excluding the region, and adhered and secured to the inner circumferential surface 32 of the sleeve 30 of the outer collar 20 via an adhesive 48, which will be described later.

As described above, in this embodiment, the securement between the end joint 12 and the cylindrical shaft 18, and the securement between the end joint 12 and the outer collar 20 are both provided via the serrated portion 14 of the end joint 12. A flange (not illustrated) may be provided on the outer circumferential surface of the outer collar 20. The flange may increase in diameter toward its radial outer end.

Figure 5:
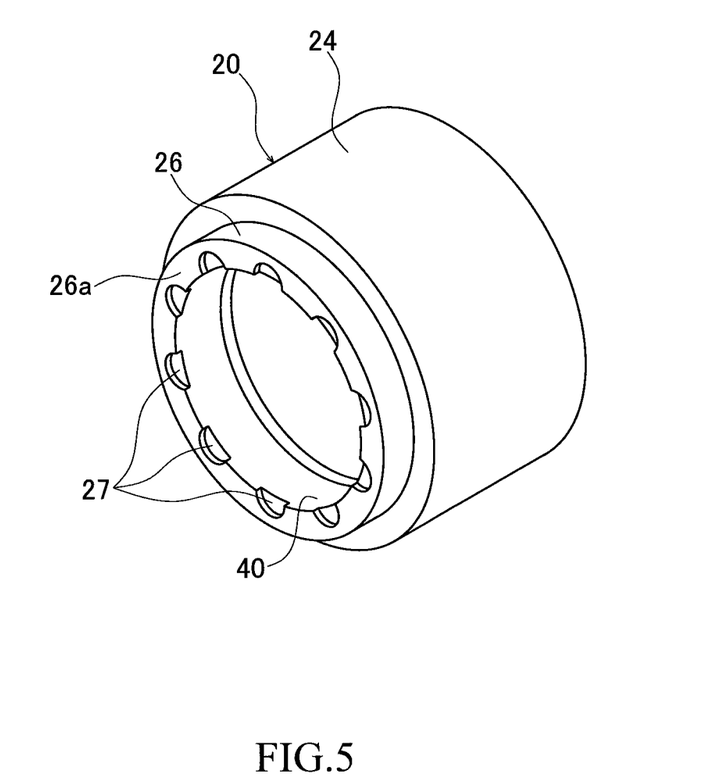
FIG. 5 is a perspective view of an outer collar.

FIG. 5 is a perspective view of the outer collar 20. As illustrated in FIG. 5, a plurality of hollow portions 27 are formed in an axial end surface (end surface adjacent to the circlip 15) 26a of the smaller diameter portion 26 in the outer collar 20. The hollow portions 27 are constituted by hollows formed in the end surface 26a in the axial direction. The plurality of hollow portions 27 are evenly spaced along the circumferential direction of the circular annular end surface 26a in a radial manner. Here, the hollow portions 27 are also recessed portions recessed radially outward from the inner circumferential edge of the circular annular end surface 26a and having an approximately semi-circular arcuate shape.

Next, a step of assembling the torque transmission shaft 10 of this embodiment will be described. FIGS. 6A to 6D are diagrams illustrating a procedure for assembling the torque transmission shaft 10. The torque transmission shaft 10 can be assembled in the following manner. Firstly, an approximately cylindrical press fitting jig 50 is prepared. The press fitting jig 50 has an annular stepped portion 52 on the outer circumferential surface (see FIG. 6A). Then, the press fitting jig 50 is secured to a securement member (not illustrated). The press fitting jig 50 includes a smaller diameter cylindrical portion 54 and a larger diameter flange portion 56, which are provided integrally with each other along the axial direction with the annular stepped portion 52 positioned in between.

Figure 6A:
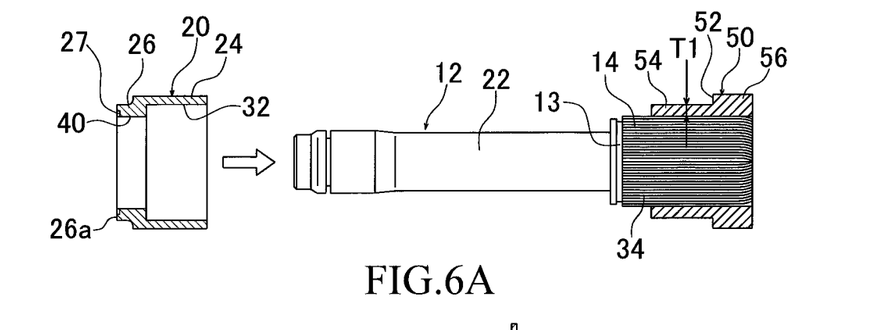
FIGS. 6A to 6D are diagrams illustrating a procedure for assembling the torque transmission shaft.
Figure 6B:
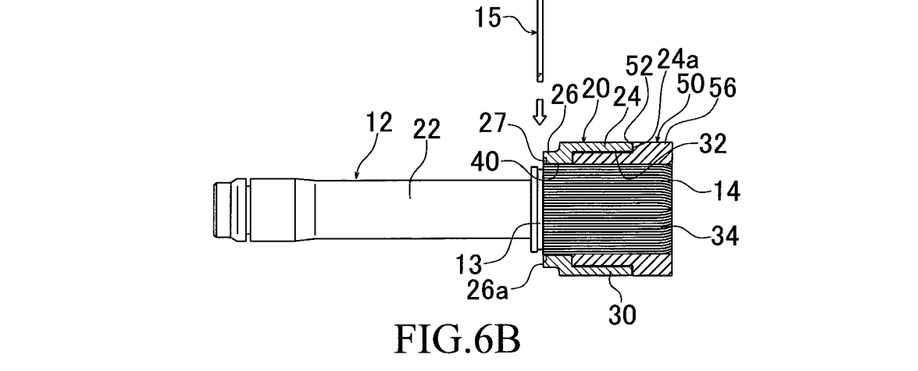

As illustrated in FIG. 6A, in the state in which the press fitting jig 50 has been placed on a predetermined position of the serrated portion 14 of the end joint 12, the outer collar 20 is slid along the axial direction (direction of the arrow) of the shank portion 22 of the end joint 12. Then, as illustrated in FIG. 6B, the inner circumferential surface 40 of the smaller diameter portion 26 of the outer collar 20 is press fitted and secured to the serrated portion 14 of the end joint 12. In this state, the smaller diameter cylindrical portion 54 of the press fitting jig 50 is inserted in the larger diameter portion 24 (sleeve 30) of the outer collar 20, and an end surface 24a of the larger diameter portion 24 is abutted against the annular stepped portion 52 of the press fitting jig 50. As a result, displacement of the outer collar 20 in the axial direction is restricted. The serrated portion 14 has a higher hardness than the outer collar 20. Thus, during press fitting and securement of the smaller diameter portion 26 of the outer collar 20 to the serrated portion 14 of the end joint 12, the serration pattern of the serrated portion 14 is transferred to the inner circumferential surface 40 of the smaller diameter portion 26.

For the press fitting and securement of the outer collar 20 to the serrated portion 14 of the end joint 12, the press fitting jig 50 functions as a positioner for positioning and securing the outer collar 20 to a predetermined position of the serrated portion 14, and also functions as a stopper for restricting displacement of the outer collar 20 in the axial direction.

Figure 6C:
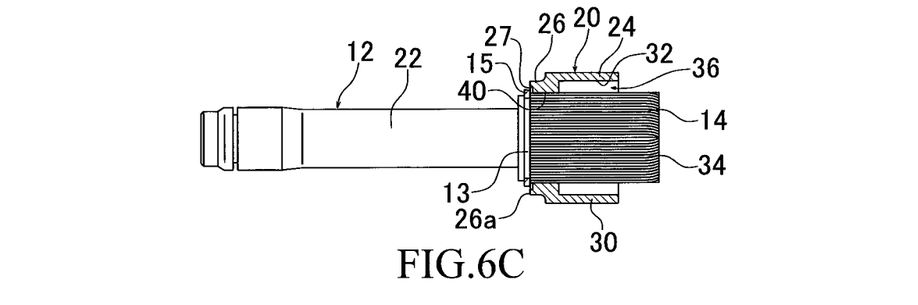

In this manner, the inner circumferential surface 40 of the smaller diameter portion 26 of the outer collar 20 is press fitted to the serrated portion 14 of the end joint 12, so that the outer collar 20 is secured to the predetermined position (end portion along the axial direction) of the serrated portion 14. As a result, the end surface (end surface adjacent to the shank portion) 26a of the smaller diameter portion 26 of the outer collar 20 and an end surface (end surface adjacent to the shank portion) 14a of the serrated portion 14 are flush or approximately flush with each other (see FIG. 6B). In this state, the circlip 15 is to be fitted in the groove 13 of the end joint 12. The circlip 15, when fitted in the groove 13, abuts the end surface 26a of the smaller diameter portion 26 of the outer collar 20 at the areas between adjacent ones of the plurality of hollow portions 27. Each of the plurality of hollow portions 27 has a radially outer end region located radially outward of the outer circumferential edge of the circlip 15. Thus, the radially outer end region is not covered by the circlip 15 and therefore exposed. Thereafter, as illustrated in FIG. 6C, the press fitting jig 50 is removed from the serrated portion 14.

Figure 6D:
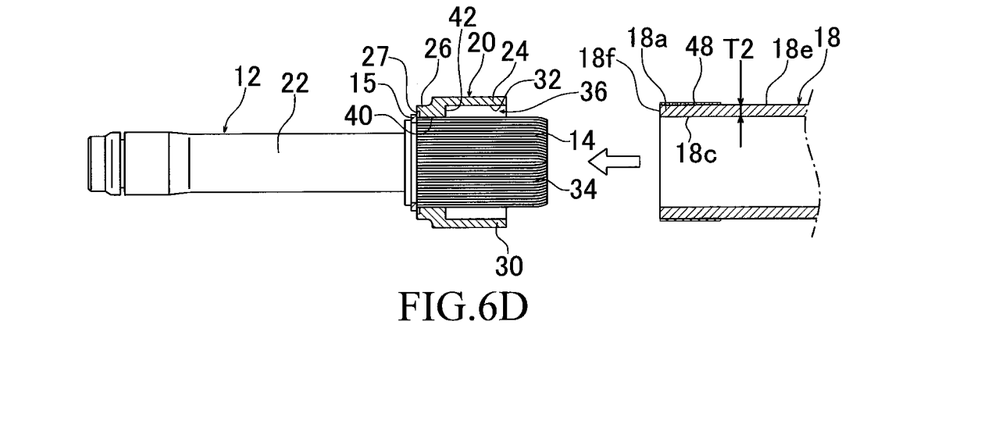

Subsequently, as illustrated in FIG. 6D, the cylindrical shaft 18 is press fitted to the serrated portion 14 of the end joint 12 from a direction (direction of the arrow) opposite to the direction from which the outer collar 20 was inserted. The adhesive 48 has been applied to the outer circumferential surface 18e of the end 18a of the cylindrical shaft 18 via an adhesive applicator (not illustrated). The end 18a of the cylindrical shaft 18 is inserted into the annular space 36, which is formed between the inner circumferential surface 32 of the sleeve 30 and the serrated portion 14. The end 18a abuts the annular side wall 42 and is thereby restricted from displacement to be secured to the predetermined position.

The cylindrical shaft 18 is made of a relatively soft material compared with the outer collar 20, which is made of metal. Thus, during press fitting of the inner circumferential surface 18c of the cylindrical shaft 18 to the serrated portion 14 of the outer collar 20, the serration pattern of the serrated portion 14 is transfer to the cylindrical shaft 18. As a result, the cylindrical shaft 18 and the outer collar 20 are tightly press fitted to each other to be restricted from rotation.

The radial wall thickness (T1) of the smaller diameter cylindrical portion 54 of the press fitting jig 50 (see FIG. 6A) is set to the total (T1=T2+α) of the radial wall thickness (T2) of the end 18a of the cylindrical shaft 18 (see FIG. 6D) and the thickness (α) of the adhesive 48 film (see FIG. 4).

With this setting, a predetermined space corresponding to the thickness (α) of the adhesive 48 film can be previously formed between the serrated portion 14 of the end joint 12 and the inner circumferential surface 32 of the outer collar 20 (sleeve 30). As a result, the adhesion between the cylindrical shaft 18 and the outer collar 20 is improved and thus the cylindrical shaft 18 and the outer collar 20 are reliably and firmly adhered to each other. Furthermore, the predetermined space is set to be uniform along the circumferential direction, so that the thickness of the adhesive 48 film is uniform.

Figure 7:
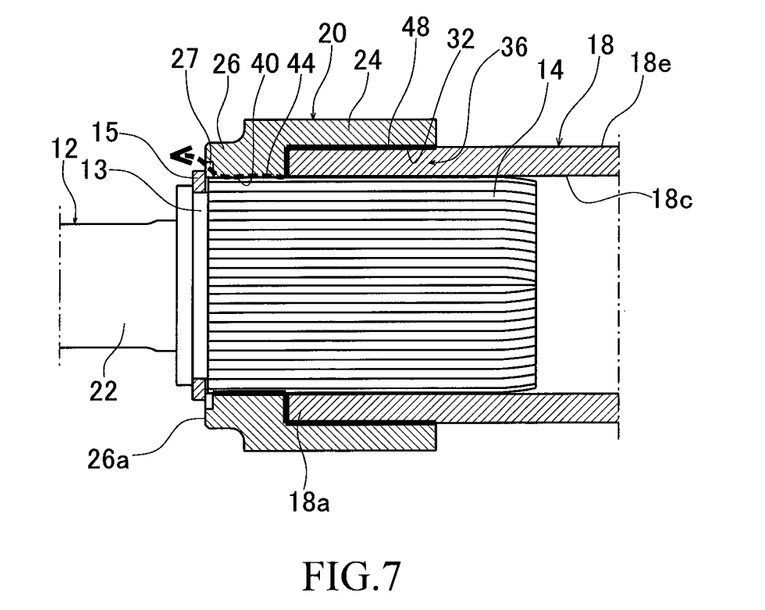
FIG. 7 is a diagram illustrating the flow of air bubbles contained in an adhesive between the outer collar (smaller diameter portion) and a serrated portion.

FIG. 7 is a diagram illustrating the flow of air bubbles contained in the adhesive 48, which is between the outer collar 20 (smaller diameter portion 26) and the serrated portion 14. The adhesive 48, applied to the outer circumferential surface 18e of the end 18a of the cylindrical shaft 18, intrudes into the clearance 44, which is between the inner circumferential surface 40 of the smaller diameter portion 26 of the outer collar 20 and the serrated portion 14 of the end joint 12. As described above, the hollow portions 27 are formed in the end surface 26a of the smaller diameter portion 26 of the outer collar 20, and via the hollow portions 27, the clearance 44 communicates with the exterior of the outer collar 20. Thus, as indicated by the arrow in FIG. 7, after the clearance 44 has been filled with the adhesive 48, air bubbles contained in the residual adhesive 48 and in the above-mentioned adhesive 48 escape out of the clearance 44 through the hollow portions 27. Consequently, the clearance 44 is filled with the adhesive 48 densely.

Furthermore, for example, when the end joint 12 and the outer collar 20 are formed from dissimilar metals (e.g., steel and aluminum), there is a possibility that electrolytic corrosion may be caused by the potential difference between dissimilar metals based on the ionization tendencies. However, in this embodiment, the adhesive 48, which fills the clearance 44 densely, forms a film between the inner circumferential surface 40 of the smaller diameter portion 26 of the outer collar 20 and the serrated portion 40 of the end joint 12, and the film keeps the dissimilar metals out of contact with each other. As a result, the occurrence of electrolytic corrosion is effectively inhibited.

As describe above, in the torque transmission shaft 10 of this embodiment, the annular groove 13 is formed at a position adjacent to the serrated portion 14 in the end joint 12 (position between the serrated portion 14 and the shank portion 22), and the circlip 15 is fitted in the annular groove 13. The circlip 15 is provided to abut and lock the end surface 26a of the smaller diameter portion 26 of the outer collar 20. The presence of the circlip 15 effectively prevents the occurrence of misalignment and disengagement of the outer collar 20 at the locations of coupling between the end joint 12 and the cylindrical shaft 18, in the step of press fitting the torque transmission shaft 10 (the end joints 12 and the cylindrical shaft 18, which are joined by the outer collars 20) to another component such as a constant velocity joint. Moreover, the plurality of hollow portions 27 are formed in the end surface 26a of the smaller diameter portion 26 of the outer collar 20. The hollow portions 27 are constituted by hollows formed in the end surface 26a in the axial direction. Via the hollow portions 27, the clearance 44, which is provided between the inner circumferential surface 40 of the smaller diameter portion 26 and the serrated portion 14, communicates with the exterior of the outer collar 20. Thus, the clearance 44, which is between the smaller diameter portion 26 of the outer collar 20 and the serrated portion 14, is not closed by the circlip 15. Thus, air bubbles can be allowed to escape out of the clearance 44, which is between the smaller diameter portion 26 of the outer collar 20 and the serrated portion 14, via the hollow portions 27. As a result, the clearance 44 is completely filled with the joining adhesive 48, and thus a high joint (securement) strength between the end joint 12 and the cylindrical shaft 18 via the outer collar 20 is achieved. Accordingly, the joint strength between the end joint 12 and the cylindrical shaft 18 is effectively increased, and thus the torque transmission shaft 10, which provides high transmission torque, is achieved.

That is, in the torque transmission shaft 10 of this embodiment, despite the presence of the circlip 15, which is used to prevent misalignment and disengagement of the outer collar 20, the escape of the air bubbles from the clearance 44, which is between the serrated portion 14 and the inner circumferential surface 40 of the outer collar 20 (smaller diameter portion 26), is ensured. As a result, air inclusion in the adhesive 48, which is used to join the outer collar 20 to the serrated portion 14 and to the cylindrical shaft 18, is reduced and therefore the adhesive strength is increased. Furthermore, the locations of joint between the outer collar 20 and the serrated portion 14 and between the outer collar 20 and the cylindrical shaft 18 are filled with the adhesive 48, and as a result, water or air, for example, is prevented from flowing into the locations of coupling. Thus, rust or corrosion will not occur in the locations of joint even when in use for an extended period of time, and therefore a decrease in strength in the torque transmission shaft 10 is effectively prevented. As a result of these, high joint (securement) strength between the end joint 12 and the cylindrical shaft 18 via the outer collar 20 is ensured.

If the hollow portions 27 of this embodiment were not provided, the clearance 44 would be closed by the circlip 15, and as a result, air bubbles contained in the adhesive 48 would remain in the clearance 44 without escaping out of the outer collar 20. Thus, there is a possibility that the adhesive 48 in the clearance 44 may be pushed out by the air bubbles with the press fitting of the outer collar 20, and consequently the interface between the smaller diameter portion 26 of the outer collar 20 and the serrated portion 14 may have a region on which the adhesive 48 is not present.

Furthermore, in the torque transmission shaft 10 of this embodiment, each of the hollow portions 27 has a radially outer end region located radially outward of the outer circumferential edge of the circlip 15. With this configuration, the hollow portions 27 are not covered by the circlip 15 but are exposed, and via the exposed portions, the air bubbles that have entered into the clearance 44 are allowed to escape out of the outer collar 20 with certainty.

The torque transmission shaft 10 according to this embodiment is basically configured as described above, and its operations and effects and advantages will be briefly described below.

The torque transmission shaft 10 according to this embodiment functions as a drive shaft for transmitting rotational torque (driving force) from an engine (drive source) mounted in a vehicle. For example, an engine (not illustrated) is coupled to the shank portion 22 of one of the end joints 12 via an inboard constant velocity joint and a differential device (not illustrated), and wheels (not illustrated) are coupled to the shank portion 22 of the other of the end joints 12 via an outboard constant velocity joint (not illustrated).

When the rotational driving force from the engine is transmitted to the torque transmission shaft 10 to impart rotational torque to the torque transmission shaft 10, the rotational torque is transmitted between the end joint 12 and the FRP cylindrical shaft (shaft main body) 18. The outer collar 20 is provided to eliminate differences in the rotational torque between the rotational torques inside and outside the cylindrical shaft 18 during the imparting of the rotational torque from the end joint 12 to the cylindrical shaft 18.

While embodiments of the present invention have been described above, the present invention is not limited to the above embodiments, and various modifications may be made within the scope of the technical ideas described in the claims, specification, and drawings. For example, the specific shape, number, and arrangement of the hollow portions 27 described in the above embodiment is merely an example, and hollow portions of any other number and shape and in any other arrangement may be provided in the connection members of torque transmission devices according to the present invention.

The invention claimed is:

1. A torque transmission device comprising:
   end joints each comprising a shaft shape and configured to transmit torque from one side to an other side;
   serrated portions each formed on an outer circumferential surface of a corresponding one of the end joints at an end of the end joint;
   a cylindrical member fitted to a region of each of the serrated portions at an inner circumferential surface of the cylindrical member;
   connection members each comprising a cylindrical shape and connecting a corresponding one of the end joints to the cylindrical member, each of the connection members comprising:
     a larger diameter portion fitted to an outer circumferential surface of the cylindrical member at an end of the cylindrical member; and
     a smaller diameter portion fitted to a corresponding one of the serrated portions, the smaller diameter portion comprising an end surface comprising at least one hollow portion, the hollow portion being constituted by a hollow formed in the end surface in an axial direction, the hollow portion allowing a clearance to communicate with an exterior of the connection member, the clearance being provided between the serrated portion and the smaller diameter portion;
   lock members each disposed at a position adjacent to the serrated portion in a corresponding one of the end joints so as to abut and lock the end surface of the smaller diameter portion of a corresponding one of the connection members.

2. The torque transmission device according to claim 1, wherein each of the lock members comprises a circlip fitted in an annular groove at the position adjacent to the serrated portion in each of the end joints, and
   wherein the hollow portion comprises a region located radially outward of an outer circumferential edge of the circlip, and at least the region is not covered by the circlip and is exposed.

3. The torque transmission device according to claim 2, wherein the larger diameter portion of each of the connection members comprises a cylindrical sleeve, and
   wherein the end of the cylindrical member is interposed between an inner circumferential surface of a corresponding one of the sleeves and a corresponding one of the serrated portions.

4. The torque transmission device according to claim 1, wherein the larger diameter portion of each of the connection members comprises a cylindrical sleeve, and
   wherein the end of the cylindrical member is interposed between an inner circumferential surface of a corresponding one of the sleeves and a corresponding one of the serrated portions.

* * * * *